(12) United States Patent
Suzuki et al.

(10) Patent No.: US 7,396,568 B2
(45) Date of Patent: Jul. 8, 2008

(54) HYDROPHILICITY PROMOTING AND MAINTAINING AGENT FOR POLYSILAZANE-CONTAINING COATING FILMS AND METHOD OF USING SAME

(75) Inventors: Tadashi Suzuki, Tokyo (JP); Hiroshi Hara, Tokyo (JP); Osamu Funayama, Shizuoka (JP); Hideo Takeuchi, Shizuoka (JP)

(73) Assignee: Clariant Finance (BVI) Limited, Tortola (VG)

( * ) Notice: Subject to any disclaimer, the term of this patent is extended or adjusted under 35 U.S.C. 154(b) by 64 days.

(21) Appl. No.: 10/506,874

(22) PCT Filed: May 13, 2003

(86) PCT No.: PCT/JP03/05945

§ 371 (c)(1),
(2), (4) Date: Sep. 3, 2004

(87) PCT Pub. No.: WO03/097760

PCT Pub. Date: Nov. 27, 2003

(65) Prior Publication Data

US 2005/0119402 A1 Jun. 2, 2005

(30) Foreign Application Priority Data

May 16, 2002 (JP) .............................. 2002-141729

(51) Int. Cl.
*B05D 5/00* (2006.01)
(52) U.S. Cl. .................................................. 427/407.1
(58) Field of Classification Search .................. 427/402
See application file for complete search history.

(56) References Cited

U.S. PATENT DOCUMENTS

2002/0045554 A1* 4/2002 Hayward et al. ............ 510/130

OTHER PUBLICATIONS

English Language Abstract of JP 58-17869 A, published Feb. 2, 1983.
English Language Abstract of JP 2000-301056 A, published Oct. 31, 2000.
English Language Abstract of JP 4-316837 A, published Nov. 9, 1992.

* cited by examiner

*Primary Examiner*—William P Fletcher, III
(74) *Attorney, Agent, or Firm*—Richard P. Silverman

(57) ABSTRACT

An aqueous solution is prepared comprising 5 to 25% by weight of an anionic surfactant, 0.5 to 20% by weight of an amphoteric surfactant, 4 to 6% by weight of a nonionic surfactant and, if necessary, an antiseptic and the aqueous solution is adjusted with an organic acid to pH in the range of 4.5 to 7.0, which is used as an undiluted solution of a hydrophilicity maintaining and promoting agent for a polysilazane-containing coating film. The undiluted solution is diluted with water to from 3 to 15 times and the resulting solution is used as a hydrophilicity promoting agent. While the undiluted solution is diluted with water to from 30 to 70 times and the resulting solution is used as a hydrophilicity maintaining agent. The hydrophilicity promoting agent is applied on an anti-fouling coating film which is formed by applying on a substrate a coating solution comprising polysilazane and, if necessary, silica conversion catalyst, and thereby the coating film is made hydrophilic in an extremely short time. Further the hydrophilicity maintaining agent is used for removing stains which adhere to the coating film and maintaining the hydrophilicity of the film.

4 Claims, No Drawings

HYDROPHILICITY PROMOTING AND MAINTAINING AGENT FOR POLYSILAZANE-CONTAINING COATING FILMS AND METHOD OF USING SAME

This application is a United States National Stage Patent Application under 35 U.S.C. § 371 of International Patent Application No. PCT/JP03/05945, filed May 13, 2003, which claims priority to Japanese Patent Application No. 2002-141729, filed May 16, 2002.

TECHNICAL FIELD

The invention relates to a hydrophilicity promoting agent and a hydrophilicity maintaining agent for a polysilazane-containing coating film and an undiluted solution thereof, and to a method of promoting or maintaining hydrophilicity of a polysilazane-containing coating film using the hydrophilicity promoting agent or the hydrophilicity maintaining agent.

BACKGROUND ART

Various kinds of measures have been conventionally taken in order to prevent a smudge on a surface of an article. The body of an automobile, for example, is easily smudged with dusts and combustion products such as an exhaust gas. For this reason, a measure has been widely adopted that wax is applied on a surface of the body to thereby prevent adhesion of a smudge. This is because the body surface is rendered water repellent by forming a wax film thereon, whereby when water is brought into contact with the body surface, it is divided into water droplets, which roll down the body surface, so that it is prevented that a smudge component in droplets adheres and stays on the body surface and in addition, even if the smudge component has adhered to the body surface, the adhered smudge is easily removed away by washing with water.

Further, products connected to a plumbing system, such as a bathtub, a kitchen sink, a bathroom sink and the like, when being used, are brought into contact with various kinds of substances or agents such as a soapy water, a facial cleansing agent, a hair dye and the like containing oil and an oily component as well as water. Smudges on such products connecting to a plumbing system are thought to occur by adhesion of the oily materials, soap scum which is a calcium salt of a soap, or the like to surfaces of the products, alone or together with dusts. In order to prevent smudges of the products, a water repellency treatment has also conventionally applied on a glazed surface which is formed on surfaces of the products and is of a glassy nature with, for example, a wax, a fluorine containing material or the like, so that smudges do not remain on the glazed surface. Prevention of smudge adhesion on a surface of interior and exterior finish of a house, a toilet bowl, a sign board, a sign, stone material such as a gravestone, a metal and the like has been tried.

On the other hand, it has been known for a long time to apply a surfactant on a surface of a base material to modify the surface to a hydrophilic nature, and it is disclosed in Japanese Patent Application Laid-Open (JP-A) No. 52-101680 and the like that a water-soluble organic polymer such as polyacrylic acid or polyvinyl alcohol is added into and mixed with a surfactant to thereby improve maintainability of hydrophilicity. Furthermore, by Japanese Examined Patent Application (JP-B) No. 5-67330 and the like, a method has been known in which hydrophilic materials such as celluloses, glycols and glycerin are fixedly applied onto an outer surface and into an inner part of a porous film made of a hydrophobic polymer through a film made of a copolymer of polyvinyl alcohol and vinyl acetate.

However, in a conventional water repellency treatment with a wax or the like, the water repellency effect was unable to be said sufficient, or even if a sufficient water repellency treatment was applied at the first stage, the effect disappeared shortly later; therefore, it was unable to be said that an anti-fouling effect was exhibited at a sufficient level over a long term.

On the other hand, as to hydrophilic coating, a conventional hydrophilic coating was effective only temporarily or for a short time in imparting hydrophilicity and not only was a sufficient durability of a water repellency effect hard to be expected, but also a water film was difficult to be uniform and a transmission image and a reflection image were distorted, having led to a problem of hard applicability to the above described products and the like.

In addition, various measures such as a fluorine treatment have also been studied on prevention of a smudge of false teeth and generation of a smell thereof, whereas the current state of the art is not at a level that a sufficient effect is kept active over a long term once a treatment is applied.

As a result of a study on and investigation into such a problem in order to solve it, the inventor previously invented an anti-fouling coating solution containing an inorganic polysilazane, a diluting solvent and a catalyst, capable of forming a silica coating at room temperature and filed an application for a patent (Japanese Patent Application No. 2001-131494). In this application, the anti-fouling coating solution is applied on a base material and thereafter left at ordinary temperature to thereby convert inorganic polysilazane to silica by the action of a catalyst and to form a rigid and dense film excellent in adhesion with the base material on a surface of the base material. The silica coating formed by conversion of the inorganic polysilazane can impart a hydrophilic effect and an anti-fouling effect maintained over a long term to the base material. Hence, the anti-fouling coating solution having been proposed by the inventor can form a hydrophilic film having an excellent anti-fouling function on bodies of an automobile, a tramcar, an airplane and the like, wheels of an automobile, interior and exterior finish of a house, products connected to a plumbing system and used at a place where water is used such as a toilet bowl, a kitchen sink, a bathroom sink and a bathtub, a sign board, a sign, a plastic product, a glass product, a stone material, false teeth and the like; and impart a preferable ant-fouling characteristic maintained over a long term to surfaces of the above things with ease.

In order to convert the anti-fouling coating solution perfectly to a hydrophilic and dense silica coating as described above, however, it usually takes a time of the order of one month after coating in a condition of being left at ordinary temperature. For this reason, in a case where the anti-fouling coating solution is applied onto the body of an automobile, for example, it is thought that, if it is new, it could be used by a final user before the anti-fouling coating solution is converted sufficiently to a silica coating after the anti-fouling solution is applied to the car in a factory and the car is delivered to the final user, and in the case, a smudge adheres to the body because of use in an immature state. It is also thought that, after an anti-fouling coating solution is applied on a car having already owned by a user in order to form an anti-fouling coat, the car is used before a not long time elapses after the coating, thereby adhering a smudge thereto. That is, the anti-fouling coating solution was unable to impart an intrinsic hydrophilic and dense coating to an article in some case according to a use mode of the article, in such case no anti-fouling effect was able to be exhibited.

The inventor, as a result of an eager study, has found that in the case where a coating solution containing polysilazane, including the above-described anti-fouling coating solution, is applied onto a base material, and thereafter, polysilazane in the coating film formed is converted to silica to form a hydrophilic and dense silica coating excellent in anti-fouling property on the surface of the base material, by application of an aqueous solution containing a specific surfactant on a coating film formed by applying a polysilazane-containing coating solution and drying, hydrophilicity of the coating film is promoted to an extremely high level and the coating film shows sufficient hydrophilicity after about 10 min. of the application, thereby being able to prevent adhesion of a smudge.

The polysilazane-containing coating film, as described above, completes conversion to silica over about one month after application in an ordinary case, and over about one month after application in a case where a hydrophilicity promoting solution of the invention is applied as well. However, there are cases where smudges adhere on the coating during the about one month or where even after the coating film is converted to silica, smudges adhere during the use over a long term. Such smudges link to reduction in hydrophilicity of the coating film, which degrades an anti-fouling effect of the coating solution. The inventor has found that smudges are wiped off with a solution obtained by further diluting a hydrophilicity promoting agent with water, thereby enabling removal of them without degrading hydrophilicity of the anti-fouling film. A hydrophilicity maintaining agent of the invention has been made based on the findings described above.

DISCLOSURE OF THE INVENTION

The invention relates to an undiluted solution of a hydrophilicity maintaining and promoting agent for a polysilazane-containing coating film; a hydrophilicity maintaining or promoting agent for a polysilazane-containing coating film, that is obtained by diluting the undiluted solution with water; and a method of promoting or maintaining hydrophilicity of a polysilazane-containing coating film using the hydrophilicity maintaining or promoting agent, set forth in the following [1] to [7].

[1] An undiluted solution of a hydrophilicity maintaining and promoting agent for a polysilazane-containing coating film that is an aqueous solution with a pH value in the range of from 4.5 to 7.0, which comprises 5 to 25% by weight of an anionic surfactant, 0.5 to 20% by weight of an amphoteric surfactant, 4 to 6% by weight of a nonionic surfactant and if necessary an antiseptic.

[2] The undiluted solution of a hydrophilicity maintaining and promoting agent for a polysilazane-containing coating film set forth in [1] described above, wherein the anionic surfactant is at least one kind selected from the group consisting of sec-alkane sulfonate, alkyl sulfate (a number of carbon atoms in the alkyl group is 8 to 18), polyoxyethylene (an average number of added moles is 1 to 4) alkyl sulfate (a number of carbon atoms in the alkyl group is 8 to 18), α-olefin sulfonate (a number of carbon atoms in the alkyl group is 10 to 18) and alkyl benzene sulfonate (a number of carbon atoms in the alkyl group is 8 to 18); the amphoteric surfactant is at least one kind selected from the group consisting of coconut oil fatty acid amide propyl betaine, alkyl dimethyl acetic acid betaine (a number of carbon atoms in the alkyl group is 8 to 18) and alkyl dimethyl amine oxide (a number of carbon atoms in the alkyl group is 8 to 18); the nonionic surfactant is at least one kind selected from the group consisting of polyoxyethylene (an average number of added moles is 3 to 12) undecyl alcohol, polyoxyethylene (an average number of added moles is 3 to 12) alkyl ether (a number of carbon atoms in the alkyl group is 8 to 18) and polyoxyethylene (an average number of added moles is 3 to 12) nonyl phenyl ether; and the antiseptic is at least one kind selected from the group consisting of benzoate, an isothiazoline based antiseptic, a thiazoline based antiseptic and a triazine based antiseptic.

[3] The undiluted solution of a hydrophilicity maintaining and promoting agent for a polysilazane-containing coating film set forth in [1] or [2] described above, wherein the pH of the solution is adjusted in the range of 4.5 to 7.0 using an organic acid after the anionic surfactant, the amphoteric surfactant and the nonionic surfactant and the antiseptic, if necessary, are dissolved into water.

[4] A hydrophilicity maintaining and promoting agent for a polysilazane-containing coating film, that is obtained by diluting the undiluted solution set forth in any one of [1] to [3] described above with water.

[5] A hydrophilicity promoting agent for a polysilazane-containing coating film, which is obtained by diluting the undiluted solution set forth in any one of [1] to [3] described above with water to from 3 to 15 times.

[6] A hydrophilicity maintaining agent for a polysilazane-containing coating film, that is obtained by diluting an undiluted solution set forth in any one of [1] to [3] described above with water to from 30 to 70 times.

[7] A method of maintaining or promoting hydrophilicity of a polysilazane-containing coating film, which comprises the steps of: preparing an undiluted solution of a hydrophilicity maintaining and promoting agent for a polysilazane-containing coating film that is an aqueous solution with pH in the range of from 4.5 to 7.0, which comprises 5 to 25% by weight of an anionic surfactant, 0.5 to 20% by weight of an amphoteric surfactant, 4 to 6% by weight of a nonionic surfactant and an antiseptic, if necessary; diluting the undiluted solution with water to form a dilute solution; and applying the dilute solution onto a polysilazane-containing coating film.

The invention also includes the following preferable aspects in an undiluted solution of a hydrophilicity maintaining and promoting agent for a polysilazane-containing coating film, a hydrophilicity maintaining and promoting agent for a polysilazane-containing coating film, a hydrophilicity promoting agent for a polysilazane-containing coating film, a hydrophilicity maintaining agent for a polysilazane-containing coating film and a method of maintaining or promoting hydrophilicity of a polysilazane-containing coating film, set forth in [1] to [7] described above.

(1) Adjustment of pH of a hydrophilicity promoting agent or a hydrophilicity maintaining agent is conducted with an organic acid.

(2) A content of an anionic surfactant in the undiluted solution is in the range of from 8 to 10% by weight.

(3) A content of an amphoteric surfactant in the undiluted solution is in the range of from 11 to 13% by weight.

(4) A content of a nonionic surfactant in the undiluted solution is in the range of from 4 to 6% by weight.

(5) A content of an antiseptic in the undiluted solution is in the range of from 0.1 to 15% by weight.

(6) The antiseptic is a benzoate.

Furthermore, the invention also includes the following more preferable aspects.

(8) The organic acid adjusting pH is citric acid.

(9) A benzoate of the antiseptic is sodium benzoate.

DETAILED DESCRIPTION OF THE INVENTION

Further detailed description will be given of the invention below. Description is presented, first of all, of a polysilazane-containing coating solution used for forming a polysilazane-containing coating film to which a hydrophilicity promoting agent or a hydrophilicity maintaining agent is applied and a method of forming an anti-fouling coating film using the polysilazane-containing coating solution, prior to description of a hydrophilicity promoting agent, a hydrophilicity maintaining agent and undiluted solutions thereof of the invention.

A polysilazane-containing solution used for forming a polysilazane-containing coating film to which a hydrophilicity promoting agent and a hydrophilicity maintaining agent of the invention are applied may be any of polysilazane-containing anti-fouling coating solutions each including polysilazane and a catalyst capable of converting the polysilazane to silica if necessary. A preferable example of such a polysilazane-containing coating solution is a polysilazane-containing anti-fouling coating solution described in Japanese Patent Application No. 2001-131491 described above having been proposed by the inventor. The anti-fouling coating solution described in Japanese Patent Application No. 2001-131491 contains an inorganic polysilazane, a diluting solvent and a catalyst, and inorganic polysilazane include compounds having repeating units each represented by the following general formula (1) and soluble in a solvent. Inorganic polysilazane used preferably in an anti-fouling solution has usually a number-average molecular weight in the range of from 600 to 3000 and the content thereof is preferably in the range of from 0.5 to 10% by weight relative to a total weight of the coating solution.

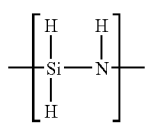
(I)

The inorganic polysilazane having repeating units represented by the general formula (I) described above and soluble in a solvent may be produced by means of any of methods including conventionally known methods. As a method of producing inorganic polysilazane having repeating units represented by the general formula above and soluble in a solvent, a method is exemplified that a dihalosilane represented by a general formula of $SiH_2X_2$ (wherein X represents a halogen atom and preferably Cl.) and a base are reacted with each other in a solvent to form an adduct of the dihalosilane, followed by a reaction of the dihalosilane adduct with ammonia to thereby synthesize an inorganic polysilazane.

A base used for formation of the adduct in this reaction has only to be a base participating in no reaction other than a reaction forming an adduct of a halosilane. Preferable examples thereof include a Luis base; tertiary amines (trialkylamine); pyridine, picoline and derivatives thereof; secondary amines each with a steric hindrance group; and phosphine, arsine and derivatives thereof, for example, trimethyl phosphine, dimethyl ethyl phosphine, methyl diethyl phosphine, trimethyl arsine, trimethylstibine, trimethylamine, triethylamine, thiophene, furan, dioxane, selenophene and the like. An amount of the base used is unnecessary to be specially strict and sufficiently in excess of a stoichiometric quantity, which is a ratio of amine:silane=2:1, relative to silane.

An amount of ammonia used upon reaction with the adduct has only to be in excess of a stoichiometric quantity relative to an amount of silane. The reaction with ammonia is conducted in a non-reactive solvent at a temperature in the range of from −78° C. to 100° C., preferably in the range of from −40° C. to 80° C. Shown below is an example production of inorganic polysilazane according to this method.

Example as Reference (Production of Inorganic Polysilazane)

To a four-necked flask with an inner volume of 300 ml, a gas blowing-in tube, a mechanical stirrer and a Dewer condenser were mounted. After substitution of the interior of a reactor with dry and deoxidized nitrogen, 150 ml of degassed and dried pyridine was put into the four-necked flask and cooled with ice. Then, 16.1 g of dichlorosilane was added into the ice-cooled pyridine over 50 min. to thereby obtain an adduct in a white solid state ($SiH_2Cl_2.2Py$). The reaction mixture was ice-cooled, into which a gas mixture of 10.9 g of ammonia purified by passing through a soda lime tube and an active carbon tube with nitrogen gas was blown over 1 hr as vigorously stirring. After the reaction, a solid product was separated by centrifugation and removed by filtration. The solvent was removed from the filtrate under vacuum (at 50° C. under a pressure of 5 mm Hg for 2 hr) to obtain 5.52 g of a glassy solid polysilazane. A molecular weight was measured 2000 according to a vapor pressure depression method. The yield was 77%.

On the other hand, a catalyst used in an anti-fouling coating solution may be any of catalysts each having a function converting inorganic polysilazane to silica at ordinary temperature. Preferable concrete examples thereof include N-hetrocyclic compounds such as 1-methylpiperazine, 1-methylpiperidine, 4,4'-trimethylenedipiperidine, 4,4'-trimethylenebis(1-methylpiperidine), diazabicyclo-[2,2,2]octane, cis-2,6-dimethylpiperazine, 4-(4-methylpiperidine) pyridine, pyridine, dipyridine, α-picoline, β-picoline, γ-picoline, piperidine, lutidine, pyrimidine, pyridazine, 4,4'-trimethylenedipyridine, 2-(methylamino)pryidine, pyrazine, quinoline, quinoxaline, triazine, pyrrole, 3-pyrroline, imidazole, triazole, tetrazole, and 1-methylpyrrolidine; amines such as methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, heptylamine, diheptylamine, octylamine, dioctylamine, trioctylamine, phenylamine, diphenylamine, and triphenylamine; in addition, DBU (1,8-diazabicyclo[5,4,0]7-undecene), DBN (1,5-diazabicyclo[4,3,0]5-nonene), 1,5,9-triazacyclododecane, 1,4,7-triazacyclononane and the like, among which 4,4'-trimethylenebis(1-methylpiperidine) is further preferable. The catalyst described above is mixed in the range of from 0.5 to 10% by weight relative to a pure inorganic polysilazane.

A diluting solvent for an anti-fouling coating solution may be any of solvents each capable of dissolving inorganic polysilazane and a catalyst. In consideration of shelf stability, preferable is a solvent having a maintained dissolving ability effective for an inorganic polysilazane and a catalyst and in consideration of use over a long term, preferable is a stable solvent with no generation of gas such as silane, hydrogen, ammonia or the like. Examples of such solvent include a petroleum solvent such as mineral spirit, a paraffin type solvent, an aromatic solvent, a naphthene and the like. Concrete examples thereof include paraffin type solvents or solvent components such as octane and 2,2,3-trimethylpentane of C8, nonane and 2,2,5-trimethylhexane of C9, decane of C10, n-undecane of C11, and the like; aromatic solvents or solvent components such as xylene of C8, cumene and mesitylene of C9, naphthalene, tetrahydronaphthalene, butylbenzene, p-cymene, diethylbenzene and tetamethylbenzene of C10, pentylbenzene of C11, and the like; and a naphthene or solvent components such as methylcyclohexane of C7, ethylcyclohexane of C8, p-menthane, α-pinene, dipentene and decalin of C10, and the like.

Anti-fouling coating solutions are required to have necessary characteristics different from each other according to respective applications of products to be coated therewith; such as outer appearance after coating therewith; dryability, a smell, safety and preventability of an influence on a base material coated therewith; and storage stability thereof. Therefore, in use of an anti-fouling coating solution, a kind and a mixing ratio of a solvent are preferably altered so as to obtain a coating solution optimal in each application, while naturally, this is true for a kind and an amount of use each of inorganic polysilazane and a catalyst.

A heavy solvent such as mineral spirit is as a solvent suitable for a bass material, a smudge on which attracts much attention and therefore outer appearance of which is seriously considered, such as an automobile painted in dark color, polished granite, a mirror-finished metal or plated base plate, transparent resin, glass and the like. PEGASOL AN4 and PEGASOL 3040 by Mobil Sekiyu K.K., which are mineral terpenes are also preferable solvents. By using mineral spirit as a solvent, beautiful surface finish can be achieved on a base material, on which a mottled pattern, an interference color, whitening, a rough surface and the like attract much attention. Though mineral spirit has advantages described above, since it is comparatively weak in respect of a dissolving ability, it is recommended, in order to enhance a dissolving ability, to mix an aromatic mixed solvent of, for example, SOLVESSO 100 and SOLVESSO 150 by Esso Oil Co.; PEGASOL R-100 and PEGASOL R-150 by Mobil Sekiyu K.K. and the like into mineral spirit. Furthermore, paraffin type solvents including no aromatic compound can also be used. Concrete examples thereof include EXSOLE DSP100/140, EXSOLE D30, EXSOLE D40 and the like, which are solvents with less of a smell, by Tonen Chemical Co.

Not to have a smell is an important requirement for products connected to a plumbing system such as a toilet bowl, a kitchen sink, a bathroom sink and a bathtub; and false teeth. For such a product requiring a smell free nature, a coating solution with less of a smell can be prepared by adding thereto as a part of a solvent methylcyclohexane, ethylcyclohexane or the like which is less smelling. An anti-fouling solution may be applied either on a new product from a fabrication line or on a product already in use.

An anti-fouling coating solution containing inorganic polysilazane is applied on surfaces of bodies of an automobile, a tramcar and an air plane; wheels of an automobile; interior and exterior finish of a house; products connected to a plumbing system such as a toilet bowl, a kitchen sink, a bathroom sink, a bathtub and the like; a sign board, a sign, a plastic product, a glass product, false teeth, stone material such as a gravestone, a metal and the like, followed by drying at ordinary temperature. Coating methods include a wet cloth wiping method, a wet sponge wiping method, a spray coating method, a flow coating method, a roller coating method, a dip coating method and the like, any of which may be used. A coating amount is sufficiently on the order in the range of from 0.1 to 2 μm as a film thickness after drying. While after application, an inorganic polysilazane is converted to a dense silica coating by the action of a catalyst, it takes a time on the order of 1 to 2 weeks to form a hydrophilic coating on a product surface and another time of the order of, usually, one month to perfectly convert inorganic polysilazane to silica when not treating with a hydrophilicity promoting agent of the invention.

Named in the following description are examples of anti-fouling coating solutions for an automobile body, interior and exterior finish of a house, products connected to a plumbing system such as a bathtub, a kitchen sink and the like, together with example compositions of the corresponding anti-fouling solutions.

EXAMPLE COMPOSITION FOR AUTOMOBILE

Inorganic polysilazane: 0.3 to 2% by weight
DMPP: 0.01 to 0.1% by weight
Xylene: 0.5 to 10% by weight
PEGASOL AN45: balance
Note that DMPP is 4.4-trimethylenebis(1 methylpiperidine).

(EXAMPLE COMPOSITION FOR INTERIOR AND EXTERIOR FINISH OF HOUSE, AND PRODUCTS CONNECTED TO PLUMBING SYSTEM SUCH AS BATHTUB AND KITCHEN SINK)

Inorganic polysilazane: 0.3 to 2% by weight
DMPP: 0.01 to 0.2% by weight
Xylene: 1 to 10% by weight
PEGASOL AN45: 5 to 88% by weight
Ethylcyclohexane: 5 to 88% by weight
Methylcyclohexane: 5 to 88% by weight Japanese Patent Application No. 2001-131491 and PCT/JP02/04069 (WO 02/088269) filed on Apr. 24, 2002 with Japanese Patent application No. 2001-131491 serving as a basis for claiming a right of priority therefore can be referred concerning details of an anti-fouling coating solution containing an inorganic polysilazane and a catalyst.

As described above, after the anti-fouling coating solution containing a polysilazane, for example, inorganic polysilazane and a catalyst for conversion thereof to silica is coated, it takes a long time for making the coating film hydrophilic by being left at ordinary temperature. In the invention, however, the coating film can be hydrophilized in a short time by treating the coating film with the hydrofilicity maintaining and promoting agent or a hydrophilicity promoting agent of [4] or [5] described above, or if necessary, with an undiluted solution of any of [1] to [3] described above.

Then, detailed description will be given below of a hydrophilicity promoting agent and a hydrophilicity maintaining agent of the invention. In the hydrophilicity promoting agent or the hydrophilicity maintaining agent of the invention, not only are an anionic surfactant (A), an amphoteric surfactant (B) and a nonionic surfactant (C) used, but an antiseptic (D) is also contained if necessary. A compositional ratio of the surfactant components (A), (B) and (C) is preferably in the range of 5 to 25:0.5 to 20:4 to 6 in weight and in a case where an antiseptic is used, a compositional ratio of components of (A), (B), (C) and (D) is preferably in the range of 5 to 25:0.5 to 20:4 to 6:0.1 to 15. When surfactant components are in the above range of a compositional ratio and have proper concentrations, a good hydrophilicity promoting effect and a good hydrophilicity maintaining effect are showed. pH is preferably in the range of 4.5 to 7.0 and more preferably in the neighborhood of 6.

Contents of the components (A) to (D) in the hydrophilicity promoting agent or the hydrophilicity maintaining agent have only to be respective proper values, that is, values in the respective ranges capable of exhibiting a hydrophilicity promoting effect and a hydrophilicity maintaining effect of a polysilazane-containing coating film. It is usually convenient to prepare an undiluted solution of a hyrophilicity promoting and maintaining agent for a polysilazane-containing coating film that contains 5 to 25% by weight of an anionic surfactant, 0.5 to 20% by weight of an amphoteric surfactant, 4 to 6% by weight of a nonionic surfactant and an antiseptic, if necessary, which is an aqueous solution with pH in the range of from 4.5 to 7, followed by diluting the undiluted solution with water to obtain a hydrophilicity promoting agent or a hydrophilicity maintaining agent at a proper concentration. A total concentration of surfactants combined in the undiluted solution is 9.5% by weight as the minimum value and in a case where the total concentration is lower than the minimum value, preparation of an undiluted solution with such a low concentration is meaningless so much. On the other hand, when a total concentration of surfactants is excessively high, a viscosity is also excessively high, in such case some kinds of surfactant may cause gelation. Therefore, a total concentration of surfactants in an undiluted solution is preferably selected from the concentration so that the corresponding surfactants are at the respective highest concentration or below and no such gelation occurs. This is because an undiluted solution in a gel state is unpreferably inconvenient in handling when the solution is diluted. In addition, amounts of the surfactants are selected preferably from respective ranges in which neither precipitation nor separation of a surfactant occurs.

In a case where a hydrophilicity promoting agent is prepared using the above undiluted solution, it is preferable to dilute the undiluted solution to 3 to 15 times. A total concentration of surfactants in a hydrophilicity promoting agent is preferably about 0.6 to 17% by weight. When the concentration of surfactants is lower than the range, no hydrophilicity promoting effect can usually be expected, while when the concentration is higher than the range, it results in waste and excessively high viscosity, which may lead to gelation. Not only is such a solution inconvenient in handling, but a hydrophility promoting agent in a gel state also unpreferably shows a non-uniform hydrophilicity promoting effect. Further, in such solution, precipitation and separation of a surfactant has a possibility at a low temperature in winter or the like. In a case where an economic issue is not a problem, the agent not in a gel state and neither of precipitation and the like occurs, a hydrophilicity promoting agent may be used at a concentration of surfactants combined higher than the above range.

When the diluted solution is used as a hydrophilicity maintaining agent, a total surfactant concentration may only be a concentration at which a smudge adhered on a polysilazane-containing coating film or a silica coating can be removed and hydrophilicity of the film can be maintain. As a preferable example, there is illustrated the hydrophilicity maintaining agent which is prepared by diluting the undiluted solution with water to 30 to 70-fold and has a proper concentration.

Hereinbefore a production method of a hydrophilicity promoting agent and a hydrophilicity maintaining agent is described in a concrete manner taking up a method for diluting the undiluted solution of the present invention with water as examples. However, other production methods may be adopted in the invention, in one of which components constituting a hydrophilicity promoting agent and a hydrophilicity maintaining agent including surfactant as primary components are individually dissolved into water directly to respective necessary concentrations and pH in the solution is adjusted to be 4.5 to 7.0. A hydrophilicity promoting agent and a hydrophilicity maintaining agent produced even by any methods are included in a hydrophilicity maintaining and promoting agent of claims 4 to 6 as far as contents of components and pH of the solution meet respective corresponding limitations in the claims.

While an anionic surfactant, an amphoteric surfactant and a nonionic surfactant as the components (A) to (C) may be any surfactants having been conventionally known, preferable examples of anionic surfactants as components (A) include sec-alkane sulfonate, alkyl sulfate (a number of carbon atoms in the alkyl group is 8 to 18), polyoxyethylene (an average number of added moles is 1 to 4) alkyl sulfate (a number of carbon atoms in the alkyl group is 8 to 18), α-olefin sulfonate (a number of carbon atoms in the alkyl group is 10 to 18) and alkylbenzene sulfonate (a number of carbon atoms in the alkyl group is 8 to 18). The salts are an alkali metal salt, an alkaline earth metal salt, an ammonium salt or an organic amine salt, for example an alkanolamine salt having 1 to 5 carbon atoms. Among the salts, an alkali metal salt is preferable and a sodium salt is more preferable.

Preferable examples of amphoteric surfactants as components (B) include coconut oil fatty acid amide propyl betaine, alkyl dimethyl acetic acid betaine (a number of carbon atoms in the alkyl group is 8 to 18) and alkyl dimethylamine oxide (a number of carbon atoms in the alkyl group is 8 to 18).

Preferable examples of nonionic surfactants as components (C) include polyoxyethylene (an average number of added moles is 3 to 12) undecyl alcohol, polyoxyethylene (an average number of added moles is 3 to 12) alkyl ether (a number of carbon atoms in the alkyl group is 8 to 18) and polyoxyethylene (an average number of added moles is 3 to 12) nonyl phenyl ether, and of polyoxyethylene (an average number of added moles is 3 to 12) undecyl alcohols, preferable is polyoxyethylene (an average number of added moles is 8) undecyl alcohol.

Contents of surfactants of components (A) to (C) are preferably in the range of 5 to 25:0.5 to 20:4 to 6 in weight, as described above, more preferably in the range of 8 to 10:11 to 13:4 to 6 in weight and further more preferably about 9:12:5 in weight, respectively. If a ratio between an anionic surfactant as a component (A) and an amphoteric surfactant as a component (B) is outside the above range, a protein modification action is enhanced, resulting in skin roughness with ease. If an amphoteric surfactant is little, not only is a skin roughened, but an adhesion of a surfactant to a coating film is degraded. If a nonionic surfactant is little, an oil cleaning ability is reduced while if a nonionic surfactant is too much, rinsability becomes poor, leading to a tendency of a surfactant to remain easily on a surface for a long time.

An antiseptic as a component (D) may be used according to a need. That is, for example, when an undiluted solution or the like is prepared and used immediately and thereby no decomposition of the solution occurs, it is not necessary to add an antiseptic to the undiluted solution or the like. A content of an antiseptic in an undiluted solution is preferably 0.1 to 15% by weight. Examples of antiseptics used in the invention include a benzoate, an isothiazoline based antiseptic, a thiazoline based antiseptic and a triazine based antiseptic. Among these, a benzoate is preferable. While a benzoate may be any of water-soluble salts, preferable are an alkali metal salt, an ammonium salt and an organic amine salt and more preferable is a sodium salt. When an amount of a benzoate is small, decomposition of a solution advances with ease, while when the amount is large, it is unpreferable for an economical reason.

The hydrophilicity promoting agent, hydrophilicity maintaining agent, hydrophilicity maintaining and promoting agent and undiluted solutions thereof of the invention are aqueous solutions and therefore, water is used as a solvent. Water is also used to dilute an undiluted solution. While water used here can be water of any kind, deionized water is preferable.

In order to prevent icing, propylene glycol, glycerin, ethylene glycol, ethyl alcohol, isopropyl alcohol and the like may be further added to a hydrophilicity promoting agent, a hydrophilicity maintaining and promoting agent and undiluted solutions thereof of the invention.

The hydrophilicity promoting agent, hydrophilicity maintaining agent, hydrophilicity maintaining and promoting agent and undiluted solutions thereof of the invention are prepared in a procedure in which predetermined amounts of components (A) to (D) are dissolved into water and pH of the aqueous solution is adjusted to 4.5 to 7.0, preferably about 6, if necessary. It is preferred to use an organic acid in adjustment of pH of the aqueous solution. And as the organic acid, citric acid is preferred. When the pH of the hydrophilicity promoting agent and the hydrophilic maintaining agent is lower than 4.5, problems such as a skin roughness and corrosion of base materials or peripheral equipments occur. When the pH exceeds 7.0, a problem of dissolving a polysilazane coating film occurs. Therefore, neither lower pH nor higher pH than the above-described range is preferable.

A treatment with the hydrophilicity promoting agent of the invention is conducted in such a way as a polysilazane-containing coating solution is applied and dried at ordinary temperature to form a coating film, followed by application of the hydrophilicity promoting agent to the coating film. While a drying time of the coating film differs according to a kind of polysilazane and a diluting solvent used in the polysilazane-containing coating solution, an environmental temperature or the like, it may be usually on the order of 30 min. or more after application. As coating methods of the hydrophilicity promoting agent, in the same way as coating of an anti-fouling solution, any coating methods can be adopted such as a wet cloth wiping method, a wet sponge wiping method, a spray coating method, a flow coating method, a roller coating method, a dip coating method and the like. The coating amount has only to be enough to cover the coating film with the solution of the promoting agent and usually on the order of 10 to 50 ml/m$^2$. After the coating film covered with the hydrophilicity promoting agent is left for a time of the order of 5 to 15 min., the hydrophilicity promoting agent is washed away with water, thereby completing the hydrophilicity promoting treatment. While a contact angle of pure water relative to the coating film formed by applying an anti-fouling coating solution differs according to a kind of polysilazane, the contact angle is usually about 80°. By treating with the hydrophilicity promoting agent of the invention for a time of the order of 10 min., a contact angle of the pure water relative to the coating film is reduced suddenly to an angle on the order of 30 to 40° from the original contact angle, which was about 80° mainly because of conversion of the coating film to silica. It takes usually 1 to 2 weeks for obtaining this contact angle only by leaving the coat in the air.

The hydrophilicity maintaining agent for a polysilazane-containing coating film of the invention is used for removal of a smudge adhered to the polysilazane-containing coating film prior to the polysilazane-containing coating film is perfectly converted to silica or after the conversion to silica. Accordingly, the "polysilazane-containing coating film" in the invention, in the sense of the wordings, includes a film prior to conversion of polysilazane to silica, a film during polysilazane is converted to silica till its perfectness and a film after polysilazane has been completely converted to silica. The hydrophilicity maintaining agent for a polysilazane-containing coating film of the invention is made of the same components as the hydrophilicity promoting agent, and a ratio of use of components (A) to (C) and a component (D), if necessary and pH of the solution are in the same ranges as in the hydrophilicity promoting agent. However concentrations of the components (A) to (D) in the hydrophilicity maintaining agent are lower as compared with the hydrophilicity promoting agent and, for example, a total content of the components (A) to (D) combined is usually in the range of 0.13 to 1.7% by weight. When a total content of the components (A) to (C) combined is excessively lower, an effect of removal of a smudge decreased. On the other hand, even if a total content of the components (A) to (C) exceeds 1.7% by weight, an ability of removal of a smudge does not change so much; therefore, the content is preferably 1.7% by weight or lower because of an economic reason. By washing away or wiping off with the hydrophilicity maintaining agent of the invention, a smudge can be removed without deteriorating hydrophilicity of a silica film and an intrinsic hydrophilicity of the silica coating can be restored and maintained. Further when a ratio between the anionic surfactant and the amphoteric surfactant falls outside the range described above, a protein modification action is strengthened to thereby cause a skin roughness with ease. In addition, when an amphoteric surfactant is little, not only skin roughness but also foam stability are worsened, which makes cleaning on an inclined surface inconvenient. On the other hand, when an amphoteric surfactant is too much, it causes a cleaning ability to be reduced. When a nonionic surfactant is little, an oil cleaning ability is reduced, while when a nonionic surfactant is too much, rinsability becomes poor, leading to a tendency of a surfactant to easily remain on a surface for a long time.

As a method of producing a hydrophilicity maintaining agent of the invention, a simple and convenient method can be exemplified in which as described above, an undiluted solution with a high concentration referred to as the undiluted solution for the hydrophilicity maintaining and promoting agent is prepared, followed by dilution of the undiluted solution with wafer to, for example, 30 to 70 times. In addition thereto, a method may be adopted in which the hydrophilicity promoting agent of the invention is diluted with water to, for example, about 2 to 25 times, and another method may naturally be adopted in which components are individually dissolved into water at respective concentrations to thereby directly prepare the hydrophilicity maintaining agent.

Any method may be adopted in washing away or wiping off a smudge with the hydrophilicity maintaining agent of the invention. After removal of a smudge, the hydrophilicity maintaining agent is washed away with water if necessary. As a simple and convenient method of removing a smudge, there is exemplified a method such that a sponge or soft cloth is soaked with the hydrophilicity maintaining agent of the invention, with which the coating film or a smudge-adhered portion on a polysilazane-containing coating film having been converted to silica is wiped to wash and remove the smudge, followed by washing away the hydrophilicity maintaining agent with water. Further since the hydrophilicity promoting agent and hydrophilicity maintaining agent of the invention are neutral or weakly acidic, no skin roughness occurs when used and a good workability is assured, as compared with a conventional alkaline cleaning agent.

BEST MODE FOR CARRYING OUT THE INVENTION

While concrete description will be given of the invention with examples below, it should be understood that the invention is not limited to the examples. Note that contact angles described in the following examples and comparative examples mean those of pure water.

EXAMPLE 1

The following compounds in corresponding amounts were mixed together: 9 parts by weight of sodium sec-alkane sulfonate, 12 parts by weight of coconut oil fatty acid amide propyl betaine, 5 parts by weight of polyoxyethylene (an average number of added moles is 8) undecyl alcohol, 3 parts by weight of propylene glycol, 0.3 parts by weight of sodium benzoate and 70.7 parts by weight of water and pH of the solution was adjusted to 6.0 with citric acid. The resulting solution was diluted with water to 3 times, which was used as a hydrophilicity promoting agent.

Spin coated on a 4-inch silicon wafer at 500 r.p.m. for 20 sec. was a polysilazane-containing solution including inorganic polysilazane at a content of 3% by weight and 4,4'-trimethylenebis(1-methylpiperidine) at a content of 0.12% by weight and thereafter, the coating film on the silicon wafer was dried in an atmosphere at a temperature of 22° C. and a relative humidity of 30% R.H. for 30 min. A contact angle relative to the coating film at this time is 83°, a thickness thereof was 730 Å and a refractive index was 1.537. The hydrophilicity promoting agent above was applied on the coating film and the coating film was left at 22° C. for 10 min. Thereafter, the hydrophilicity promoting agent was washed away with water. A contact angle relative to the coating film after drying was 33°, a thickness thereof was 730 Å and a refractive index was 1.528.

COMPARATIVE EXAMPLE 1

After the polysilazane-containing solution described in Example 1 was spin coated at 500 r.p.m. for 20 sec. on a 4-inch silicon wafer, the wet coating film was left in an atmosphere at 22° C. and a relative humidity of 30% R.H. without coating the hydrophilicity promoting agent thereon to thereby hydrophilize the coating film. It was 10 days after put into the atmosphere that a contact angle relative to the coating film became 33°.

EXAMPLE 2

The following compounds in corresponding amounts were mixed together: 8.4 parts by weight of sodium sec-alkane sulfonate, 3.6 parts by weight of coconut oil fatty acid amide propyl betaine, 5 parts by weight of polyoxyethylene (an average number of added moles is 8) undecyl alcohol, 3 parts by weight of propylene glycol, 0.3 parts by weight of sodium benzoate and 79.7 parts by weight of water and pH of the solution was adjusted to 6.0 with citric acid. The resulting solution was diluted with water to 50 times, which was used as a hydrophilicity maintaining agent.

Grease was applied on the coating film obtained in Example 1 and a contact angle was measured with a result of 95°. A sponge was soaked with the hydrophilicity maintaining agent above to wash the coating film with the wet sponge. The hydrophilicity maintaining agent was washed away with water to dry the coating film. A contact angle relative to the coating film after drying was 32°, a thickness thereof was 732 Å and a refractive index was 1.527.

EXAMPLE 3

The following compounds in corresponding amounts were mixed together: 15 parts by weight of sodium sec-alkane sulfonate, 10 parts by weight of coconut oil fatty acid amide propyl betaine, 3 parts by weight of polyoxyethylene (an average number of added moles is 8) undecyl alcohol, 3 parts by weight of propylene glycol, 0.3 parts by weight of sodium benzoate and 68.7 parts by weight of water and pH of the solution was adjusted to 6.0 with citric acid. The resulting solution was diluted with water to 10 times, which was used as a hydrophilicity promoting agent.

Spin coated on a 4-inch silicon wafer at 500 r.p.m. for 20 sec. was an inorganic polysilazane solution at a content of 3% by weight (NP-140 made by Clariant Japan K.K.) and thereafter, the coating film on the silicon wafer was dried in an atmosphere at a temperature of 22° C. and a relative humidity of 30% R.H. for 30 min. A contact angle relative to the coating film at this time is 80°, a thickness thereof was 725 Å and a refractive index was 1.538. The hydrophilicity promoting agent above was applied on the coating film and the wet coating film was left at 22° C. for 10 min. Thereafter, the hydrophilicity promoting agent was washed away with water. A contact angle relative to the coating film after drying was 42°, a thickness thereof was 727 Å and a refractive index was 1.527.

EXAMPLE 4

The following compounds in corresponding amounts were mixed together: 10 parts by weight of sodium sec-alkane sulfonate, 10 parts by weight of coconut oil fatty acid amide propyl betaine, 12 parts by weight of polyoxyethylene (an average number of added moles is 8) undecyl alcohol, 3 parts by weight of propylene glycol, 0.3 parts by weight of sodium benzoate and 64.7 parts by weight of water and pH of the solution was adjusted to 6.0 with citric acid. The resulting solution was diluted with water to 70 times, which was used as a hydrophilicity maintaining agent.

Grease was applied on the coating film obtained in Example 3 and a contact angle was measured with a result of 100°. A sponge was soaked with the hydrophilicity maintaining agent above to wash the coating film with the wet sponge. The hydrophilicity maintaining agent was washed away with water to dry the coating film. A contact angle relative to the coating film after drying was 40°, a thickness thereof was 725 Å and a refractive index was 1.527.

COMPARATIVE EXAMPLE 2

Grease was applied on the coat obtained in Example 3 and a contact angle relative to the coating film was measured with a result of 100°. A sponge was soaked with a commercial car body cleaning agent (Car Mypet Vega made by KAO CORPORATION) to wash the coating film with the wet sponge. After drying, white powder was wiped off with a clean waste cloth. The grease was removed to obtain a glossy surface. A contact angle relative to the coating film after treatment was 90°, a thickness thereof was 720 Å and a refractive index was 1.522.

EXAMPLE 5

The following compounds in corresponding amounts were mixed together: 10 parts by weight of sodium α-olefin sulfonate, 12 parts by weight of alkyldimethyl acetic acid betaine, 3 parts by weight of polyoxyethylene (an average number of added moles is 8) undecyl alcohol, 3 parts by weight of propylene glycol, 0.3 parts by weight of sodium benzoate and 71.7 parts by weight of water and pH of the solution was adjusted to 6.0 with citric acid. The resulting solution was diluted with water to 5 times, which was used as a hydrophilicity promoting agent.

Spin coated on a 4-inch silicon wafer at 500 r.p.m. for 20 sec. was an inorganic polysilazane solution at a content of 3% by weight (NP-140 made by Clariant Japan K.K.) and thereafter, the coating film on the silicon wafer was dried in an atmosphere at a temperature of 22° C. and a relative humidity of 30% R.H. for 30 min. A contact angle relative to the coating film at this time is 82°, a thickness thereof was 730 Å and a refractive index was 1.538. The hydrophilicity promoting agent above was applied on the coating film and the wet coating film was left at 22° C. for 10 min. Thereafter, the hydrophilicity promoting agent was washed away with water. A contact angle relative to the coating film after drying was 40°, a thickness thereof was 728 Å and a refractive index was 1.527.

EXAMPLE 6

The following compounds in corresponding amounts were mixed together: 10 parts by weight of sodium α-olefin sulfonate, 10 parts by weight of alkyldimethyl acetic acid betaine, 4 parts by weight of polyoxyethylenenonyl phenyl ether, 3 parts by weight of propylene glycol, 0.3 parts by weight of sodium benzoate and 72.7 parts by weight of water and pH of the solution was adjusted to 6.0 with citric acid. The resulting solution was diluted with water to 50 times, which was used as a hydrophilicity maintaining agent.

Grease was applied on the coating film obtained in Example 5 and a contact angle was measured with a result of 100°. A sponge was soaked with the hyrophilicity maintaining agent above to wash the coating film with the wet sponge. The hydrophilicity maintaining agent was washed away with water to dry the coating film. A contact angle relative to the coating film after drying was 42°, a thickness thereof was 732 Å and a refractive index was 1.527.

EXAMPLE 7

The following compounds in corresponding amounts were mixed together: 9 parts by weight of sodium alkylbenzene sulfonate, 12 parts by weight of alkyldimethyl amine oxide, 3 parts by weight of polyoxyethylenenonyl phenyl ether, 3 parts by weight of propylene glycol, 0.3 parts by weight of sodium benzoate and 72.7 parts by weight of water and pH of the solution was adjusted to 6.0 with citric acid. The resulting solution was diluted with water to 3 times, which was used as a hydrophilicity promoting agent.

Spin coated on a 4-inch silicon wafer at 500 r.p.m. for 20 sec. was an inorganic polysilazane solution at a content of 3% by weight (NP-140 made by Clariant Japan K.K.) and thereafter, the coating film on the silicon wafer was dried in an atmosphere at a temperature of 22° C. and a relative humidity of 30% R.H. for 30 min. A contact angle relative to the coating film at this time is 79°, a thickness thereof was 732 Å and a refractive index was 1.538. The hydrophilicity promoting agent above was applied on the coating film and the wet coating film was left at 22° C. for 10 min. Thereafter, the hydrophilicity promoting agent was washed away with water. A contact angle relative to the coating film after drying was 48°, a thickness thereof was 730 Å and a refractive index was 1.527.

EXAMPLE 8

The following compounds in corresponding amounts were mixed together: 10 parts by weight of sodium polyoxyethylenealkyl sulfonate, 12 parts by weight of alkyloylamide propyl betaine, 3 parts by weight of polyoxyethylenealkyl ether, 3 parts by weight of propylene glycol, 0.3 parts by weight of sodium benzoate and 71.7 parts by weight of water and pH of the solution was adjusted to 6.0 with citric acid. The resulting solution was diluted with water to 50 times, which was used as a hydrophilicity maintaining agent.

Grease was applied on the coating film obtained in Example 7 and a contact angle was measured with a result of 98°. A sponge was soaked with the hydrophilicity maintaining agent above to wash the coating film with the wet sponge. The hydrophilicity maintaining agent was washed away with water to dry the coating film. A contact angle relative to the coating film after drying was 45°, a thickness thereof was 732 Å and a refractive index was 1.527.

EXAMPLE 9

The following compounds in corresponding amounts were mixed together: 5 parts by weight of sodium sec-alkane sulfonate, 5 parts by weight of ammonium alkane sulfonate, 6 parts by weight of coconut oil fatty acid amide propyl betaine, 6 parts by weight of alkyldimethyl acetic acid betaine, 3 pats by weight of polyoxyethylene(8)undecyl alcohol, 3 parts by weight of polyoxyethylenenonyl phenyl ether, 3 parts by weight of propylene glycol, 0.3 parts by weight of sodium benzoate and 68.7 parts by weight of water and pH of the solution was adjusted to 6.0 with citric acid. The resulting solution was diluted with water to 3 times, which was used as a hydrophilicity promoting agent.

Spin coated on a 4-inch silicon wafer at 500 r.p.m. for 20 sec. was an inorganic polysilazane solution at a content of 3% by weight (NP-140 made by Clariant Japan K.K.) and thereafter, the coating film on the silicon wafer was dried in an atmosphere at a temperature of 22° C. and a relative humidity of 30% R.H. for 30 min. A contact angle relative to the coating film at this time is 83°, a thickness thereof was 735 Å and a refractive index was 1.537. The hydrophilicity promoting agent above was applied on the coating film and the wet coating film was left at 22° C. for 10 min. Thereafter, the hydrophilicity promoting agent was washed away with water. A contact angle relative to the coating film after drying was 38°, a thickness thereof was 730 Å and a refractive index was 1.528.

EXAMPLE 10

The following compounds in corresponding amounts were mixed together: 5 parts by weight of sodium sec-alkane sulfonate, 5 parts by weight of potassium alkylbenzene sulfonate, 6 parts by weight of coconut oil fatty acid amide propyl betaine, 6 parts by weight of alkyloylamide propyl betaine, 3 parts by weight of polyoxyethylene (an average number of added moles is 8) undecyl alcohol, 3 parts by weight of polyoxyethylenealkyl ether, 3 part by weight of propylene glycol, 0.3 part by weight of sodium benzoate and 71.7 parts by weight of water and pH of the solution was adjusted to 6.0 with citric acid. The resulting solution was diluted with water to 70 times, which was used as a hydrophilicity maintaining agent.

Grease was applied on the coating film obtained in Example 9 and a contact angle was measured with a result of 105°. A sponge was soaked with the hyrophilicity maintaining agent above to wash the coating film with the wet sponge. The hydrophilicity maintaining agent was washed away with water to dry the coating film. A contact angle relative to the coating film after drying was 40°, a thickness thereof was 728 Å and a refractive index was 1.527.

EFFECTS OF THE INVENTION

Effects described below are obtained by the present invention:

(1) By applying a hydrophilicity promoting agent of the invention on a polysilazane-containing coating film comprising a polysilazane, for example an inorganic polysilazane, and a silica conversion catalyst used when required, the coating film reveals a hydrophilicity in an extremely short time; thereby enabling attachment of dirt onto the coating film to be prevented.

(2) By wiping off dirt attached onto a polysilazane-containing coating film during conversion thereof to silica or dirt attached onto the film after the film has been converted to silica with a hydrophilicity maintaining agent of the invention, the dirt can be removed from the coating film without reducing a hydrophilicity of the coating film and an intrinsic hydrophilicity of the silica coat can be recovered and maintained.

(3) Since a hydrophilicity promoting agent and a hydrophilicity maintaining agent of the invention are neutral or weakly acidic, no skin roughness occurs with a good workability as compared with a common alkali cleaning agent.

INDUSTRIAL APPLICABILITY

A hydrophilicity promoting agent and a hydrophilicity maintaining agent of the invention are preferably used as a hydrophilicity promoting agent and a hydrophilicity maintaining agent for a polysilazane-containing anti-fouling coating film on various products such as an automobile body, bodies of a tramcar and an airplane, wheels of an automobile, interior and exterior finish of a house, products in which water is used, and which are connected to a plumbing system such as a toilet bowl, a kitchen sink, a bathroom sink, a bathtub, a sign board, a sign, a plastic product, a glass product, stone material, false teeth and the like.

The invention claimed is:

1. A method of maintaining or promoting the hydrophilicity of a polysilazane-containing coating film, which comprises steps of: preparing an undiluted solution of a hydrophilicity maintaining or promoting agent for a polysilazane-containing coating film, wherein said undiluted solution is an aqueous solution with pH in the range of from 4.5 to 7.0, wherein said solution comprises 5 to 25% by weight of an anionic surfactant, 0.5 to 20% by weight of an amphoteric surfactant, 4 to 6% by weight of a nonionic surfactant and, optionally, an antiseptic; diluting the undiluted solution with water; and applying the dilute solution onto a polysilazane-containing coating film.

2. The method of maintaining or promoting the hydrophilicity of a polysilazane-containing coating film according to claim 1, wherein the anionic surfactant is at least one kind selected from the group consisting of sec-alkane sulfonate, $C_{8-18}$ alkyl sulfate, polyoxyethylene $C_{8-18}$ alkyl sulfate having an average of 1 to 4 ethylene oxide added moles, α-olefin sulfonate having an alkyl group of from 10 to 18 carbon atoms, and $C_{8-18}$ alkyl benzene sulfonate; the amphoteric surfactant is at least one kind selected from the group consisting of coconut oil fatty acid amide propyl betaine, $C_{8-18}$ alkyl dimethyl acetic acid betaine, and an $C_{8-18}$ alkyl dimethyl amine oxide; the nonionic surfactant is at least one kind selected from the group consisting of polyoxyethylene undecyl alcohol having an average of 3 to 12 ethylene oxide added moles, polyoxyethylene alkyl ether having an average of 3 to 12 ethylene oxide added moles, and polyoxyethylene nonyl phenyl ether having an average of 3 to 12 ethylene oxide added moles; and the antiseptic is at least one kind selected from the group consisting of benzoate, an isothiazoline based antiseptic, a thiazoline based antiseptic and a triazine based antiseptic.

3. The method of maintaining or promoting the hydrophilicity of a polysilazane-containing coating film according to claim 1, wherein the dilute solution is obtained by diluting the undiluted solution with water to from 3 to 15 times.

4. The method of maintaining or promoting the hydrophilicity of a polysilazane-containing coating film according to claim 1, wherein the dilute solution is obtained by diluting the undiluted solution with water to from 30 to 70 times.

* * * * *